US012744831B2

(12) United States Patent
Bruno et al.

(10) Patent No.: US 12,744,831 B2
(45) Date of Patent: Sep. 22, 2026

(54) CUSTOMER IDENTITY AND ACCESS MANAGEMENT

(71) Applicant: Wells Fargo Bank, N.A., San Francisco, CA (US)

(72) Inventors: John Bruno, Scottsdale, AZ (US); Thirupathirao Modukuri, Chandler, AZ (US); Mahesh Tawari, Fremont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 57 days.

(21) Appl. No.: 19/027,186

(22) Filed: Jan. 17, 2025

(65) Prior Publication Data

US 2026/0214146 A1 Jul. 23, 2026

(51) Int. Cl.
*H04L 67/306* (2022.01)
*G06F 8/36* (2018.01)
(Continued)

(52) U.S. Cl.
CPC .............. *H04L 67/306* (2013.01); *G06F 8/36* (2013.01); *G06F 8/38* (2013.01); *H04L 63/102* (2013.01)

(58) Field of Classification Search
CPC ....... H04L 67/306; H04L 63/102; G06F 8/36; G06F 8/38
See application file for complete search history.

(56) References Cited

U.S. PATENT DOCUMENTS 7,610,233 B1 * 10/2009 Leong .................. G06Q 10/087 705/28
7,761,794 B1 7/2010 Chari et al.
(Continued)

FOREIGN PATENT DOCUMENTS

WO 2018097928 A1 5/2018
WO 2020118457 A1 6/2020
WO 2022221610 A1 10/2022

OTHER PUBLICATIONS

U.S. Appl. No. 17/658,015, filed Apr. 5, 2022.
(Continued)

*Primary Examiner* — Kostas J Katsikis
(74) *Attorney, Agent, or Firm* — Merchant & Gould P.C.

(57) ABSTRACT

An example system for managing identity and access within a federated digital ecosystem includes functionality to store and manage identity data associated with users across federated identity domains, which represent distinct organizational boundaries. The system provides authentication and access control services based on open standards and enforces a unified policy framework for access control, entitlements, and consent management. A marketplace stores and manages reusable, modular micro frontend experiences, enabling their retrieval and reuse across application experiences. The system dynamically generates personalized user experiences by assembling micro frontend experiences based on contextual rules and user preferences, integrating identity data to tailor interactions across channels, including web, mobile, and embedded third-party systems. Communication and synchronization ensure consistent propagation of identity updates, including user attributes, entitlements, and consent settings, across federated domains and user interfaces, enabling secure, adaptive, and scalable operations.

20 Claims, 8 Drawing Sheets

(51) Int. Cl.
*G06F 8/38* (2018.01)
*H04L 9/40* (2022.01)

(56) References Cited

U.S. PATENT DOCUMENTS 9,104,392 B1 8/2015 Dunagan et al.
10,230,815 B2 3/2019 Pinko
10,439,898 B2 10/2019 Ranjekar
10,983,782 B1 4/2021 Mitra et al.
11,086,698 B1 8/2021 Nitsopoulos
11,137,887 B1 10/2021 Garibaldi et al.
11,150,791 B1 10/2021 Garibaldi et al.
11,216,602 B2 1/2022 Bourhani et al.
11,411,800 B1 8/2022 Murugesan et al.
11,475,513 B2 * 10/2022 Bowie ................ G06Q 20/3223
12,517,725 B2 * 1/2026 Belardo .................... G06F 8/36
2002/0196277 A1 12/2002 Bushey et al.
2003/0126079 A1 7/2003 Roberson et al.
2007/0255653 A1 11/2007 Tumminaro et al.
2009/0150536 A1 6/2009 Wolman et al.
2013/0207988 A1 8/2013 Artigue et al.
2015/0379581 A1 12/2015 Bruno et al.
2016/0034258 A1 2/2016 Wijngaard et al.
2016/0283833 A1 9/2016 Peek
2016/0335454 A1 11/2016 Choe et al.
2016/0350197 A1 12/2016 Amichai et al.
2017/0024308 A1 1/2017 Knoulich
2018/0284975 A1 10/2018 Carrier et al.
2018/0307390 A1 10/2018 Fang et al.
2019/0347143 A1 11/2019 Carteri et al.
2020/0204618 A1 6/2020 Agarwal et al.
2020/0285516 A1 9/2020 Darling et al.
2020/0387965 A1 12/2020 Cella
2021/0117571 A1 4/2021 Prakash et al.
2021/0132962 A1 5/2021 Makhija et al.
2021/0192106 A1 6/2021 Bourhani et al.
2021/0248205 A1 8/2021 Tank et al.
2021/0294717 A1 9/2021 Wang et al.
2021/0326396 A1 10/2021 Chugh et al.
2021/0365445 A1 11/2021 Robell et al.
2022/0114214 A1 4/2022 Reddymakireddy et al.
2022/0283805 A1 9/2022 Dasa et al.
2022/0300524 A1 9/2022 Banerjee et al.
2022/0358240 A1 11/2022 Neal et al.
2022/0382522 A1 12/2022 Heynemann Nascentes Da Silva et al.
2022/0383284 A1 12/2022 Rastogi et al.
2022/0405152 A1 12/2022 Edamadaka et al.
2023/0009811 A1 1/2023 Bakos et al.
2023/0036980 A1 2/2023 Chen et al.
2023/0110520 A1 4/2023 Ding et al.
2023/0251835 A1 8/2023 Manohar et al.
2023/0368288 A1 11/2023 Bruno et al.
2024/0103939 A1 3/2024 Singh et al.
2024/0220217 A1 * 7/2024 Hori .......................... G06F 8/38
2024/0394021 A1 * 11/2024 Bhargava .................. G06F 8/36
2026/0037947 A1 * 2/2026 Angel .................. G06Q 20/202
2026/0058027 A1 * 2/2026 Moyer .................. G16H 80/00

OTHER PUBLICATIONS

U.S. Appl. No. 63/268,935, filed Mar. 7, 2022.
U.S. Appl. No. 17/663,572, filed May 16, 2022.
U.S. Appl. No. 18/174,054, filed Feb. 24, 2023.

* cited by examiner

Figure 2

CUSTOMER IDENTITY AND ACCESS MANAGEMENT

BACKGROUND

Modern organizations increasingly rely on complex digital systems to manage user identity and access across various platforms and channels. These systems often include web applications, mobile devices, and embedded third-party integrations, each requiring secure authentication, authorization, and consent management. However, managing user identities across these diverse environments poses significant challenges, particularly as organizations expand their operations and adopt distributed architectures. Existing identity and access management solutions frequently rely on isolated systems that lack interoperability, leading to inefficiencies in managing user data, fragmented user experiences, and difficulties in ensuring consistent access policies across applications and domains.

These challenges are exacerbated by the reliance on legacy architectures and siloed identity domains that operate without standardized frameworks for sharing identity attributes or policies. As a result, workflows that span multiple domains are often cumbersome, requiring redundant configurations and duplicative access control mechanisms. Furthermore, traditional identity systems often fail to accommodate the dynamic nature of modern user interactions, such as varying contextual requirements, cross-channel access, and the need for granular entitlements.

SUMMARY

Embodiments of the present disclosure relate to a concept for managing identity and access within a federated digital ecosystem, enabling secure, adaptive, and personalized user experiences across diverse channels. The concept involves storing and managing identity data for a plurality of users associated with one or more federated identity domains, each representing a distinct organizational boundary for managing access. The concept leverages open standards for authentication and access control while implementing a unified policy framework to enforce access control, entitlements, and consent management. A centralized marketplace stores reusable, modular micro frontend experiences, which are dynamically assembled into personalized user interfaces based on contextual rules and user preferences. The federated experience engine integrates identity and access management data with these micro frontend experiences to ensure tailored interactions across channels, including web, mobile, and embedded third-party systems.

The concept supports advanced features such as multi-factor authentication, role-based and attribute-based access control, and adaptive authentication mechanisms, which allow dynamic adjustments to access requirements based on contextual factors like user behavior and location. The concept ensures synchronization of identity attributes, entitlements, and consent settings across federated identity domains through the control messaging facility, while the consent management mechanism enables users to update permissions for sharing identity attributes. Additional features include a notification mechanism for alerting users to changes in consent or authentication activity and integration with regulatory compliance frameworks to maintain audit logs and ensure adherence to data privacy regulations. These capabilities collectively provide a scalable, secure, and efficient framework for managing identity and access in distributed architectures.

The details of one or more techniques are set forth in the accompanying drawings and the description below. Other features, objects, and advantages of these techniques will be apparent from the description, drawings, and claims.

DESCRIPTION OF THE DRAWINGS

FIG. 2 illustrates example logical components of a server device of the platform of FIG. 1.

DETAILED DESCRIPTION

Figure 1:
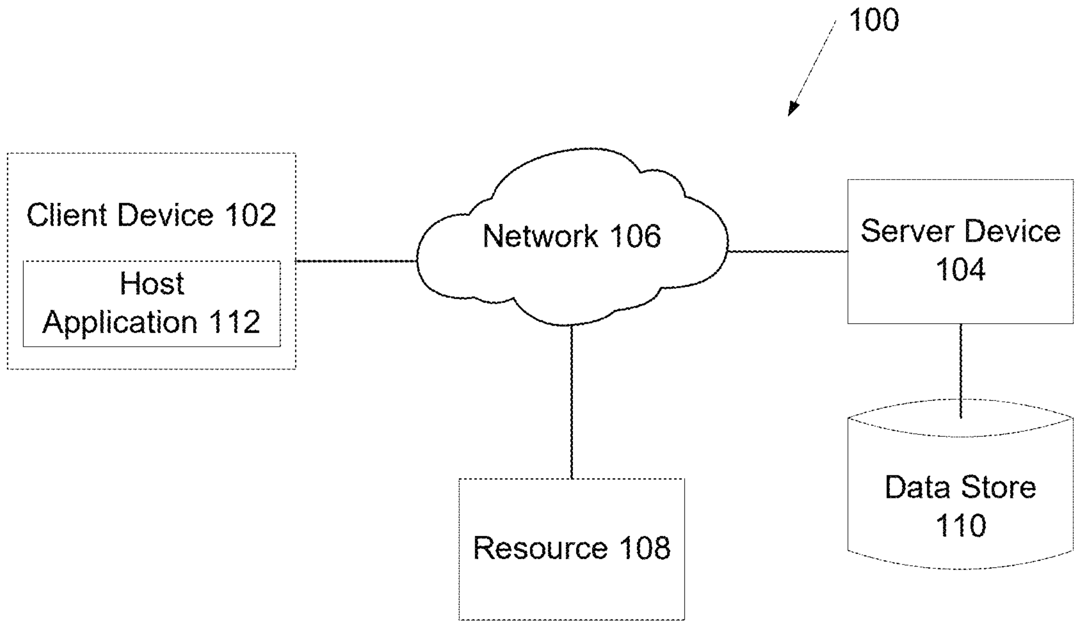
FIG. 1 illustrates an example system designed to integrate federated identity data to facilitate secure, adaptive interactions across web, mobile, and embedded third-party channels.

The present disclosure generally relates to managing user identity and access within a federated digital ecosystem by integrating an identity and access management module, a marketplace for reusable micro frontend experiences, and a federated experience engine to facilitate secure, adaptive, and personalized interactions across multiple channels.

Modern digital ecosystems face challenges in managing identity and access for users across diverse channels, such as web applications, mobile platforms, and embedded third-party systems. Existing identity and access management solutions often rely on siloed systems and monolithic architectures, leading to fragmented user experiences, inefficiencies in managing identity data, and difficulties in enforcing consistent access policies. These challenges are further exacerbated by the lack of standardized frameworks for sharing identity attributes across federated domains, making cross-domain workflows cumbersome and complex. Organizations struggle to deliver personalized, secure, and adaptive user experiences while ensuring compliance with regulatory requirements and maintaining scalability to accommodate growing user bases and evolving demands.

To address these issues, the present concept provides an integrated framework for managing identity and access in a federated digital ecosystem, enabling secure, adaptive, and personalized user interactions across multiple channels. The concept includes a unified identity and access management architecture that securely stores and manages user identity data across one or more federated identity domains, which can represent distinct organizational boundaries for managing identity and access. The concept can leverage open standards, such as OpenID Connect (OIDC) and OAuth, to ensure interoperability and implements a unified policy framework for enforcing access control, entitlements, and consent management. By centralizing identity management, the concept eliminates redundancies and enhances the efficiency of cross-domain workflows.

One aspect of the concept is the integration of a centralized marketplace for storing and managing reusable, modular micro frontend experiences (MFEs). These MFEs are user interface components conformant with a predefined platform framework, enabling their retrieval and reuse across multiple application experiences. The marketplace provides tools for versioning, metadata tagging, and managing MFEs, ensuring their discoverability and seamless integration into various user experiences. This modular approach reduces development complexity and accelerates the deployment of new features, while supporting tailored user interactions based on contextual rules and user preferences.

An experience engine generates individualized user experiences by assembling MFEs retrieved from the marketplace and integrating federated identity data. In embodiments, the experience engine can apply contextual rules, user preferences, and role-based entitlements to compose personalized user interfaces that adapt to the user's specific needs and the channel being accessed. By leveraging federated identity data, the experience engine can aid in ensuring that each user experience is secure, relevant, and compliant with the unified policy framework, delivering consistent functionality across web, mobile, and embedded third-party systems.

The concept further includes a control messaging facility to manage communication and synchronization between components, including the identity management architecture, the centralized marketplace, and the experience engine. The control messaging facility can aid in ensuring that updates to user identity attributes, entitlements, and consent settings are consistently propagated across federated identity domains and are accurately reflected in the assembly and presentation of user experiences. By maintaining synchronization, the control messaging facility serve to reduce discrepancies and promote a more seamless operation across the ecosystem.

Advanced features of the concept include multi-factor authentication, which can enhance security by requiring multiple verification factors, such as something the user knows, has, or is. The concept can also support role-based access control and attribute-based access control, providing granular control over access permissions. Additionally, adaptive authentication mechanisms can be configured to dynamically adjust access requirements based on contextual factors, such as user behavior, geographic location, or the sensitivity of the resource being accessed.

To support user autonomy and regulatory compliance, the concept can implement a consent management subsystem that enables users to specify and update permissions for sharing identity attributes. A notification subsystem can alert users to changes in consent settings, entitlements, or authentication activity, ensuring transparency and enhancing trust. The concept can also integrate with regulatory compliance frameworks, for example, to maintain audit logs of authentication attempts, access requests, and consent updates to ensure adherence to data privacy regulations.

Embodiments of the present disclosure are directed to a concept rooted in computer technology, addressing specific technical challenges associated with managing identity and access in distributed digital ecosystems. The concept resolves inefficiencies in existing systems by providing a unified framework that integrates federated identity domains, a centralized marketplace for reusable MFEs, and a federated experience engine. Traditional identity and access management systems face challenges such as fragmented user workflows, inconsistent enforcement of access policies, and difficulties in synchronizing identity attributes across multiple channels. By leveraging a centralized marketplace and a federated experience engine to dynamically assemble personalized user interfaces, and by integrating a control messaging facility to ensure consistent propagation of identity updates, the present concept provides a specific technological solution. This approach facilitates modular development, dynamic customization of user experiences, and seamless synchronization across federated identity domains, significantly improving the adaptability, security, and efficiency of identity and access management systems.

The disclosed concept delivers a technical improvement over traditional identity and access management systems by integrating the combined functionalities of federated identity management, a marketplace for reusable MFEs, and a federated experience engine. The concept ensures consistent synchronization of identity data, such as user attributes, entitlements, and consent settings, across multiple channels, including web, mobile, and embedded third-party systems, thereby enhancing the overall functionality of identity management frameworks. Furthermore, advanced features such as multi-factor authentication, adaptive authentication mechanisms, and role-based or attribute-based access control dynamically adjust access permissions based on contextual factors, directly addressing the technical complexities of securing identity and access management systems in distributed environments. Together, these features represent a specific improvement to computer systems and networks by streamlining identity-related operations, enhancing system scalability, and ensuring compliance with evolving technological and regulatory requirements.

Further elaborations, nuances, and applications of systems utilizing micro front-ends, as described herein, are detailed in the following U.S. Patent Applications: U.S. patent application Ser. No. 17/663,572, filed on May 16, 2022, entitled "Micro Frontend (MFE) Contextual Experiences"; U.S. patent application Ser. No. 18/329,749, filed on Jun. 6, 2023, entitled "Micro-frontend Composition and Polymorphism"; U.S. patent application Ser. No. 18/333,222, filed on Jun. 12, 2023, entitled "Hub for Micro Front-End Service"; and U.S. patent application Ser. No. 18/519,707, filed on Nov. 27, 2023, entitled "Omni-Channel Micro Frontend Control Plane." The content, teachings, and disclosures of the aforementioned patent applications are hereby incorporated by reference, to the extent that they do not conflict with the teachings presented herein.

FIG. 1 illustrates a schematic of a system 100 configured to manage identity and access within a federated digital ecosystem and dynamically generate personalized user experiences using reusable micro frontend experiences. The system includes one or more client devices 102 operatively connected to a server device 104 via a network 106. The client device 102 provides a host application 112, which facilitates the retrieval, customization, and deployment of MFEs. The host application 112 may be accessed through a web portal or deployed as a standalone application on the client device 102, enabling the dynamic composition of user interfaces tailored to specific roles and preferences.

The users of the client device 102 may vary depending on the context. For example, a customer of a financial organization might use the host application to access third-party platforms that incorporate functionality provided by the system 100. In another scenario, the user could be an employee of a corporate customer tasked with defining access rules for other employees managing financial data. Alternatively, the user could be an employee of a financial organization or a regulatory agency, using the host application to ensure compliance with authorization requirements and regulatory standards.

The server device 104 is connected to a data store 110, which securely manages identity data, including user attributes, entitlements, and consent settings, as well as operational data required for MFE deployment. This data store maintains compliance-related information, such as audit logs and regulatory metadata, to ensure adherence to privacy and security standards. The centralized storage enables seamless integration of federated identity data with MFEs and supports consistent policy enforcement across the federated identity domains.

The client device 102 interacts with the server device 104 to execute tasks such as assembling MFEs retrieved from a marketplace, integrating identity and access management data, and dynamically generating personalized user experiences. The server device 104, which may comprise a single server or a distributed server network, includes computational resources to process data, manage federated identity synchronization, and ensure that MFEs operate efficiently across diverse channels, including web, mobile, and embedded third-party systems.

The network 106 serves as the communication backbone, facilitating real-time data exchange between the client device 102 and the server device 104. This infrastructure supports dynamic interactions between MFEs and system components, ensuring seamless integration and responsiveness in the generated user experiences. The system leverages this connectivity to propagate updates to identity attributes, entitlements, and consent settings, ensuring consistent functionality and policy enforcement across federated identity domains.

In some embodiments, the system 100 further includes one or more resources 108 to enhance the deployment and functionality of MFEs. These resources may include machine learning algorithms, regulatory compliance tools, or external data feeds, such as geographic information, behavioral analytics, or other contextual metrics. Such resources contribute to the dynamic assembly of MFEs and enable their deployment within a containerized service mesh ecosystem, ensuring scalability and adaptability to evolving requirements.

Figure 2:
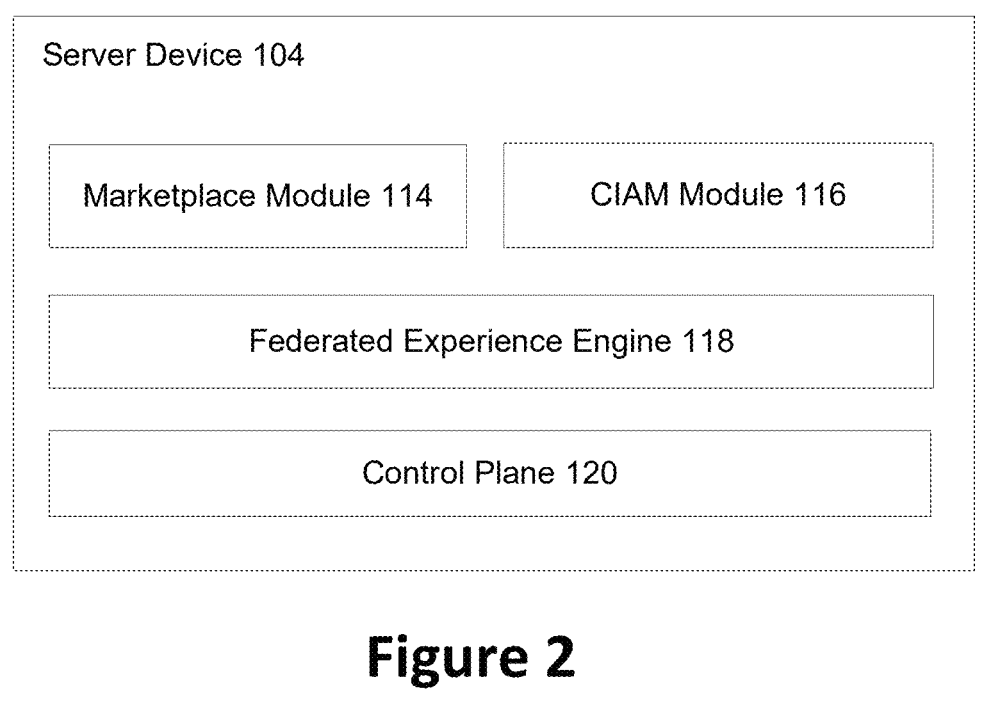

FIG. 2 illustrates an embodiment of the server device 104 as depicted in FIG. 1. In embodiments, the server device 104 can include a marketplace module 114, a Customer Identity and Access Management (CIAM) module 116, a federated experience engine 118, and a control plane 120, among other components. These components collectively facilitate the management and integration of identity data, MFEs, and personalized user interfaces within the federated digital ecosystem. Specifically, the marketplace module 114 can generally serve to store and manage reusable MFEs, enabling their retrieval and reuse across multiple application experiences. The CIAM module 116 can securely manage user identity data, including attributes, entitlements, and consent settings, ensuring consistent enforcement of access policies across different domains or organizational units (e.g., a corporate banking division, a retail banking division, a third-party payment processor, etc.). The federated experience engine 118 can integrate integrating MFEs retrieved from the marketplace module with federated identity data managed by the CIAM module to create personalized user experiences. The control plane 120 can orchestrate communication and synchronization between these components, ensuring seamless propagation of updates and real-time coordination to deliver secure, adaptive, and scalable user experiences.

In some embodiments, the marketplace module 114 can be configured to store, manage, and enable the retrieval of reusable micro frontend experiences (MFEs) for integration into user interfaces. MFEs serve as the modular building blocks of a user experience and are designed to perform specific functions or provide discrete features within products or services available to customers. For example, an MFE may facilitate the display of transactional data, initiate a wire transfer, or handle user preferences. By adhering to a predefined platform framework, MFEs are inherently compatible with the system architecture, ensuring seamless integration and interoperability across various channels and federated identity domains.

The marketplace module 114 provides a centralized repository for storing MFEs, allowing them to be versioned, tagged with metadata, and made discoverable for reuse across different application experiences. This capability reduces redundancy in development by enabling teams to share and repurpose existing MFEs rather than creating similar components from scratch. Each MFE stored in the marketplace can be associated with metadata describing its functionality, compatibility, and version history, facilitating efficient retrieval and deployment. By centralizing the management of MFEs, the marketplace module 114 can enhance collaboration among development teams and accelerates the introduction of new features and services.

The MFEs stored in the marketplace module 114 can be designed to be composable, allowing them to be dynamically assembled into tailored user interfaces by the federated experience engine 118. Each MFE can be implemented as a self-contained module, capable of functioning independently or as part of a larger composite user interface. This composability enables organizations to create personalized experiences by selecting and integrating MFEs that align with specific user roles, preferences, and contextual requirements. For example, a financial services application may compose an interface for a corporate treasurer by integrating MFEs for account balance reporting, wire transfer approvals, and expense analytics.

In addition to enabling dynamic composition, the marketplace module 114 supports the ongoing maintenance and updating of MFEs. When a new version of an MFE is introduced, the marketplace ensures that existing user interfaces can be updated seamlessly, minimizing disruption to end users. Furthermore, the metadata tagging capabilities of the marketplace allow administrators to identify and track dependencies between MFEs, ensuring compatibility and mitigating potential conflicts during updates.

The CIAM module 116 is responsible for securely managing identity data associated with users across one or more federated identity domains, where each domain represents a distinct organizational boundary for managing access and entitlements. The CIAM module 116 can provide the foundational identity and access management capabilities that underpin the system, including authentication, access control, and consent management. By leveraging open standards, which are publicly available and widely adopted protocols or specifications designed to ensure compatibility, interoperability, and security, the CIAM module 116 can facilitate seamless integration across diverse systems and platforms. Examples of such open standards include OpenID Connect (OIDC) and OAuth, which provide frameworks for secure authentication and authorization, enabling the CIAM module 116 to effectively manage identity data and access permissions within the federated digital ecosystem.

One feature of the CIAM module 116 is to store and synchronize user identity attributes, entitlements, and consent settings across federated identity domains, which represent distinct organizational boundaries within the system. Each federated identity domain may have its own set of policies, access requirements, and administrative controls. A user associated with multiple federated identity domains may have different identity attributes, entitlements, or consent settings in each domain. For instance, in one domain, a user could have credentials and entitlements granting access to corporate financial data for processing payroll, while in another domain, the same user might have limited access to a reporting dashboard with no permission to modify data.

Identity attributes include user-specific metadata such as roles, security clearance, or authentication credentials necessary for determining access. Entitlements define the specific actions a user is authorized to perform within a domain, such as initiating wire transfers, approving transactions, or accessing sensitive records. Consent settings enable the user to specify how their identity attributes can be shared or used within the system or with third-party applications. For example, a user might grant consent to share their location data for one domain while restricting it in another. The CIAM module ensures that these variations are consistently represented and synchronized across domains, allowing seamless user interactions across channels, including web platforms, mobile applications, and embedded third-party systems, while adhering to the policies and preferences defined for each federated identity domain.

The CIAM module 116 can implement a unified policy framework to enforce access control and entitlements, supporting both role-based and attribute-based access control. In this framework, a role is modeled as a collection of entitlements and attributes, allowing for flexible representation of capabilities associated with specific user functions. For example, a role such as "wire transfer manager" may encompass entitlements related to initiating, approving, and monitoring wire transfers. This approach enables roles to dynamically adapt to various user contexts and ensures that MFEs align with the entitlements associated with these roles, facilitating personalized and functional user experiences.

To enhance security, the CIAM module 116 can support multi-factor authentication, requiring users to verify their identity using multiple factors, such as a password, a hardware token, or biometric data. The CIAM module 116 can also include adaptive authentication capabilities, to dynamically adjust authentication requirements based on contextual factors, such as user behavior, geographic location, or the sensitivity of the resource being accessed. These advanced authentication mechanisms ensure that the system can respond to potential security threats while maintaining usability.

Another feature of the CIAM module 116 is its ability to integrate with regulatory compliance frameworks. In some embodiments, CIAM module 116 can maintain comprehensive audit logs of authentication attempts, access requests, and consent updates to ensure adherence to data privacy regulations, such as GDPR or CCPA. These audit logs can provide visibility into user activities and system interactions, enabling organizations to demonstrate compliance and identify potential anomalies or breaches.

The CIAM module 116 can work in close coordination with other components of the system, such as the marketplace module 114 and the federated experience engine 118, to ensure that identity data is accurately applied to user experiences. For example, when a user accesses an MFE, the CIAM module 116 can validate the user's identity and applies the appropriate entitlements and access policies. By doing so, the CIAM module 116 can ensure that user experiences are both secure and aligned with organizational requirements.

The federated experience engine 118 can be configured to dynamically generate personalized user experiences by integrating MFEs retrieved from the marketplace module 114 with identity data managed by the CIAM module 116. Acting as the orchestration layer for assembling modular user interfaces, the federated experience engine can apply contextual rules, user preferences, and role-based entitlements to create customized experiences tailored to individual users and their specific access requirements. By leveraging the modularity of MFEs and the granularity of identity data, the federated experience engine 118 can deliver adaptive, secure, and seamless interactions across various federated domains or channels, including web, mobile, and embedded third-party systems.

One feature of the federated experience engine 118 is the composition of user interfaces by selecting and assembling MFEs that align with collections of entitled attributes associated with user roles. For example, a corporate treasurer may have entitlements such as initiating wire transfers, approving transactions, and generating financial reports. These entitlements collectively define the role and inform the specific MFEs presented within the user interface. By treating roles as collections of entitled attributes, the federated experience engine 118 ensures that user interfaces are tailored to the needs of individual users.

Additionally, the federated experience engine 118 can integrate federated identity data managed by the CIAM module 116 to ensure that each user experience complies with the unified policy framework. This integration can involve applying access control policies, entitlements, and consent settings to the user's interactions with MFEs. For instance, the federated experience engine 118 may restrict access to certain MFEs based on a user's geographic location, device type, or organizational policies. By dynamically incorporating these parameters into the composition process, the federated experience engine 118 can aid in ensuring that user interfaces are secure, compliant, and relevant to the user's needs.

To further enhance usability, the federated experience engine 118 can support real-time adaptability by responding to changes in user context or system conditions. For example, if a user's location changes during a session, the federated experience engine 118 may dynamically adjust the available MFEs or require additional authentication based on updated contextual factors. This real-time adaptability can aid in ensuring that user experiences remain secure and consistent, even in dynamic or complex operational environments.

The federated experience engine 118 can also facilitate cross-MFE communication, enabling MFEs within a user interface to interact seamlessly. For example, an MFE displaying transaction data can communicate with another MFE handling wire approvals to prepopulate fields or validate user inputs, thereby streamlining workflows and improving the efficiency of user interactions. This capability ensures that the assembled user interfaces function cohesively, enhancing the overall user experience.

In addition to its core composition and integration capabilities, the federated experience engine 118 can leverage contextual rules and machine learning algorithms to enhance personalization and engagement. In some embodiments, these rules can analyze user behavior, historical preferences, and organizational policies to determine the most relevant MFEs for a given user. Machine learning algorithms can further refine these selections over time, adapting to evolving user needs and optimizing the user interface for usability and productivity.

The control plane 120 can be configured to orchestrate communication, synchronization, and policy enforcement across the various components of the system, including the CIAM module 116, the marketplace module 114, and the federated experience engine 118. By serving as a central coordination layer, the control plane 120 can ensure that updates to user identity attributes, entitlements, and consent settings stored in the CIAM module are consistently propagated throughout the system, to facilitate the seamless generation and delivery of composed user experiences that align with user preferences and organizational access policies.

One feature of the control plane 120 is its ability to manage real-time interactions between the federated experience engine 118 and the CIAM module 116. For example, when a user accesses an application, the control plane 120 retrieves the user's identity data, including entitlements and consent settings, from the CIAM module 116 and ensures that this data is applied to the MFEs retrieved from the marketplace module 114. This integration allows the federated experience engine 118 to compose user interfaces that reflect user preferences while enforcing access controls and entitlements defined in the unified policy framework managed by the CIAM module 116.

The control plane 120 also supports dynamic adaptability by monitoring changes in user context or system state and propagating these changes across the system in real time. For instance, if a user updates their consent settings in the CIAM module 116, the control plane 120 can ensure that the update is immediately reflected in the federated experience engine 118, which adjusts the user interface accordingly. Similarly, if a user's entitlements are modified due to organizational policy changes, the control plane 120 can synchronize these updates to maintain consistency and compliance across all user experiences.

The control plane 120 can further facilitate cross-component communication using a messaging infrastructure designed to enable reliable and efficient data exchange. This infrastructure can ensure that the marketplace module 114, the federated experience engine 118, and the CIAM module 116 share information and maintain synchronization. For example, when a new version of an MFE is deployed to within the marketplace module 114, the control plane 120 can ensure that all associated user interfaces are updated without disrupting ongoing user sessions. This capability enhances the modularity and scalability of the system by supporting seamless updates and reducing downtime.

By integrating the CIAM module 116 into the composed user experience, the control plane 120 can ensure that identity data is applied consistently throughout the system's functionality. The control plane 120 enforces the access policies and entitlements defined in the CIAM module, 116 ensuring that every component of the user interface adheres to these rules. For example, if a user's geographic location restricts access to certain MFEs, the control plane 120 can dynamically apply this restriction during the user interface composition process, maintaining compliance with organizational and regulatory policies.

The control plane 120 can also support auditability and transparency by tracking interactions between system components and maintaining logs of user activities, such as authentication attempts, access requests, and consent updates. These logs, generated in coordination with the CIAM module 116, can provide a comprehensive record of system behavior, enabling organizations to demonstrate compliance with regulatory requirements and identify potential security anomalies.

By synchronizing identity data, managing cross-component communication, and enforcing policies defined in the CIAM module 116, the control plane 120 enables the system to deliver composed user experiences that are secure, adaptive, and compliant. This orchestration layer ensures that the various components of the system function cohesively, addressing the challenges of managing complex user interactions within a federated digital ecosystem.

Figure 3:
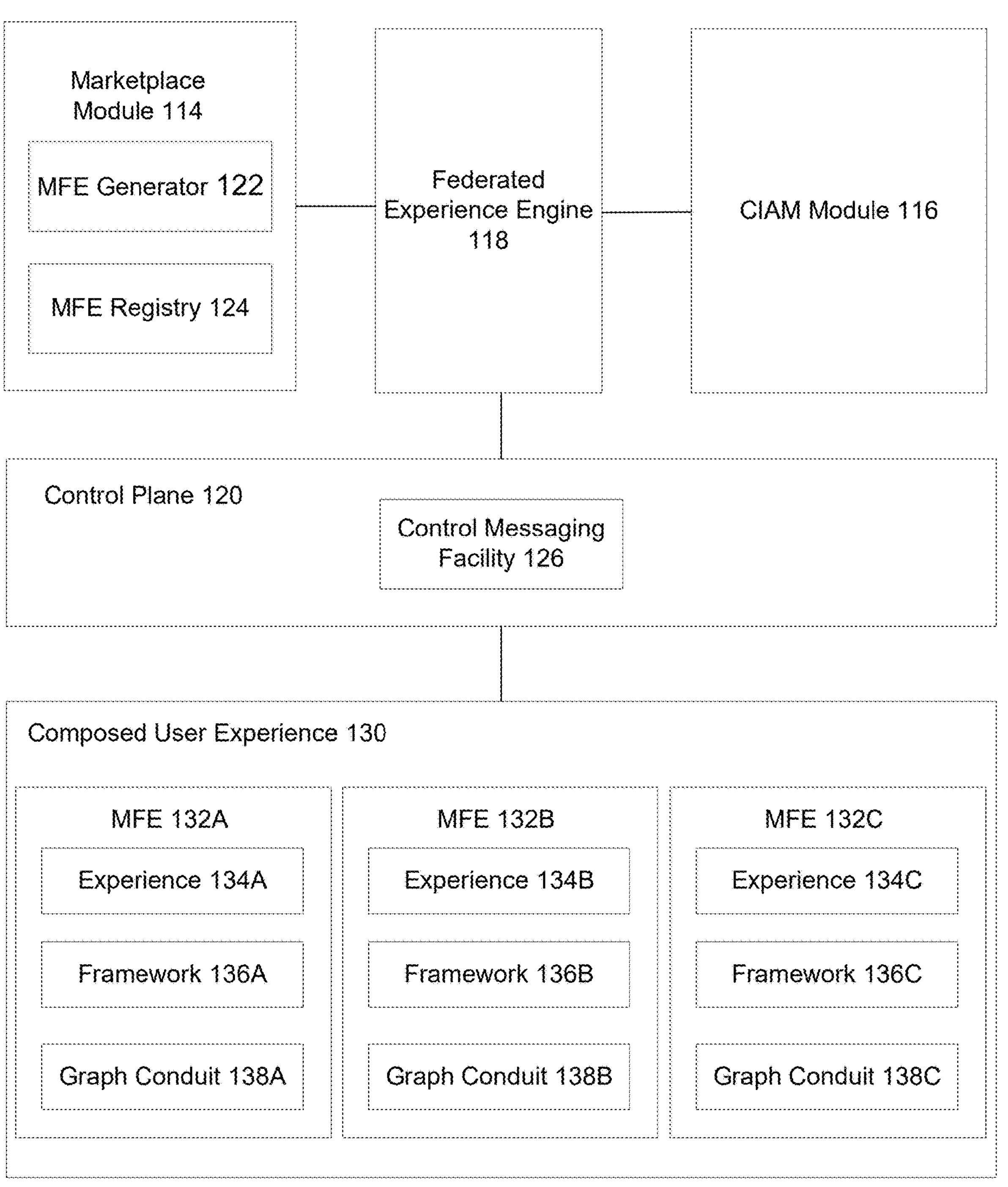
FIG. 3 illustrates an architecture diagram that provides a high-level representation of both the structural components and operational interactions within the system of FIG. 1.

FIG. 3 illustrates an architecture diagram that provides a high-level representation of both the structural components and operational interactions within a system for managing identity and access in a federated digital ecosystem. The diagram depicts how the marketplace module 114, the CIAM module 116, the federated experience engine 118, and the control plane 120 are organized and interconnect to achieve their functions. Additionally, the architecture diagram highlights the process by which these components cooperate to produce a composed user interface 130, which represents a product of the system 100. As depicted, the composed user interface 130 can comprise a plurality of MFEs 132A, 132B, and 132C, which can be assembled based on user identity attributes, entitlements, and contextual preferences.

In embodiments, the marketplace module 114 can serve as a centralized repository for enterprise reusable MFEs that conform to a predefined platform framework. The marketplace module 114 can include an MFE generator 122, which enables the creation of new MFEs based on specific functional requirements, and an MFE registry 124, which represents a searchable centralized marketplace for storing and retrieving these MFEs. Each MFE is a modular user interface component designed to perform discrete functions, such as processing transactions, displaying analytics, or managing user settings. The MFE generator 122 can be used to create MFEs by leveraging the platform framework and associated domain-specific language, ensuring compatibility and reusability across application experiences. Once created, MFEs can be registered in the MFE registry 124 with metadata, including versioning, functionality descriptions, and compatibility details, enabling efficient discovery and integration into user interfaces.

The CIAM module 116 serves as a federated identity and authorization platform, securely managing user identity data, entitlements, and consent settings across federated identity domains. The CIAM module 116 can force access control and authentication policies while maintaining compliance with regulatory requirements. The federated experience engine 118 can communicate with both the marketplace module 114 and the CIAM module 116 to dynamically generate user experiences tailored to individual users. Specifically, the federated experience engine can retrieve MFEs from the marketplace module 114 based on contextual rules and combines them with identity attributes, entitlements, and consent settings provided by the CIAM module 116, thereby ensuring that the composed user interface 130 reflects the user's role, preferences, and access permissions.

The control plane 120 can oversee the dynamic experience control process, ensuring synchronization and coordination across system components. Within the control plane 120, the control messaging facility 126 facilitates real-time communication between the marketplace module 114, the CIAM module 116, and the federated experience engine 118. The control messaging facility handles the propagation of updates, such as changes to user identity attributes, entitlements, or consent settings, ensuring that these updates are immediately reflected in the dynamically generated user experiences. While the control plane 120 provides overall coordination and policy enforcement, the control messaging facility 126 focuses specifically on maintaining reliable and efficient communication, ensuring seamless data exchange and synchronization across the system.

Together, these components enable the system to deliver personalized, secure, and adaptive user experiences. The marketplace module 114 ensures the availability of reusable MFEs, the CIAM module 116 provides a secure foundation for identity and access management, the federated experience engine 118 dynamically composes user interfaces, and the control plane 120 orchestrates synchronization and communication.

Each MFE 132A-C depicted in FIG. 3 includes an experience component 134A-C, a framework component 136A-C, and a graph conduit component 138A-C. These components operate in conjunction with user identity data, entitlements, and consent settings stored in the CIAM module 116. By cooperating with the marketplace module 114, the federated experience engine 118, and the control plane 120, these components can be used to tailor the user experience to align with the specific identity attributes, access permissions, and preferences of the user.

For example, in one embodiment, the experience component 134A can represent the user-facing functionality of the MFE and can be designed to provide domain-specific interactions that reflect the user's identity data and entitlements. Developed by federated teams focusing on a customer domain needs, the experience component can aid in ensuring that only the information and actions permitted by the user's identity attributes and access settings are displayed. For instance, a corporate user with entitlements to approve wire transfers might see workflows tailored to that function, while another user with entitlements to view account balances might see an entirely different interface. The experience component leverages consent settings stored in the CIAM module 116 to ensure compliance with the user's preferences for data sharing and access.

The framework component 136A can simplify the development and integration of MFEs by providing tools that inherently support the incorporation of user identity data, entitlements, and consent settings into the user experience. The framework component 136A can leverage developer frameworks aligned with the platform architecture to promote conformity and interoperability. For example, the framework component 136A can facilitate generating the MFE with a GraphQL conduit tied to specific data sources, such as transaction records or entitlement policies stored in the CIAM module 116. By streamlining the creation of MFEs, the framework component 136A can aid in ensuring that each MFE is consistently integrated into the system and tailored to the individual's identity attributes and preferences.

The graph conduit component 138A can serve as the data pipeline connecting the MFE to system data sources, enabling the retrieval and use of user identity data, entitlements, and consent settings. The graph conduit component 138A can allow the MFE to dynamically access relevant information stored in the CIAM module 116 and other repositories managed by the server device 104. For example, the graph conduit component 138A may retrieve consent settings to ensure data is only displayed or shared in accordance with the user's preferences or fetch real-time entitlements to customize the functionality presented by the MFE. This integration ensures that the MFE operates contextually, adapting its behavior and display based on the user's identity and system policies.

Together, the experience component 134A, framework component 136A, and graph conduit component 138A enable the MFE 132A to deliver personalized, compliant, and secure functionality that reflects the identity data, entitlements, and consent settings managed by the CIAM module 116. In cooperation with the marketplace module 114, which provides access to reusable MFEs, the federated experience engine 118, which dynamically composes user interfaces, and the control plane 120, which ensures synchronization and communication, these components contribute to a cohesive and tailored user experience.

Figure 4:
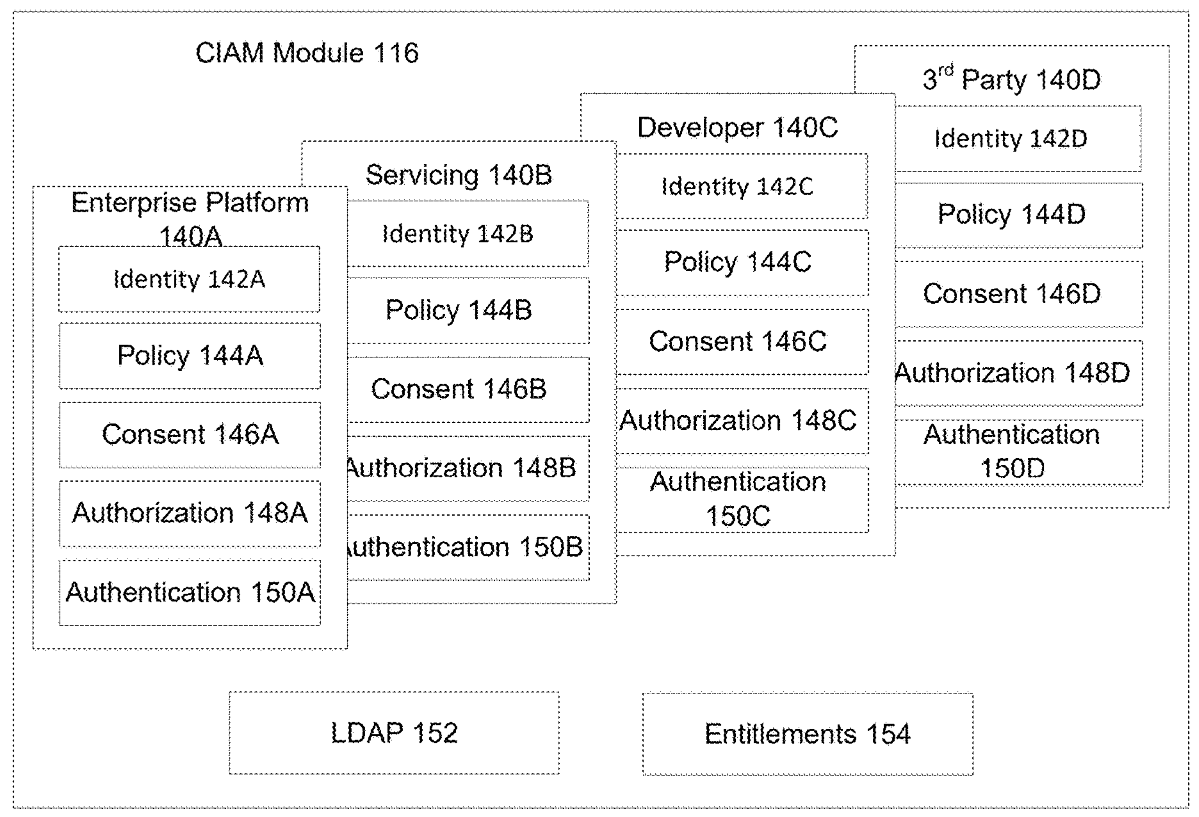
FIG. 4 illustrates an architecture diagram providing a high-level representation of both the structural components and operational interactions within a Customer Identity and Access Management module of FIG. 2.

FIG. 4 illustrates an architecture diagram providing a high-level representation of both the structural components and operational interactions within the CIAM module 116. This diagram highlights how the CIAM module 116 organizes and manages user credentials (e.g., identity attributes, entitlements, contextual preferences, etc.) across various federated domains, which in the example shown include an enterprise platform credentials 140A, a servicing credentials 140B, a developer credentials 140C, and a third-party platform credentials 140D. By maintaining unified but distinct structures for these domains, the CIAM module 116 is configured to provide consistent identity and access management while accommodating the distinct requirements of each domain.

In embodiments, the LDAP module 152 serves a role in maintaining user credentials by serving as a directory service for storing and retrieving user identity attributes. These attributes may include usernames, passwords, roles, and other metadata necessary to define a user's identity and enable authentication and authorization. By providing a hierarchical and scalable storage framework, the LDAP module 152 can enable the CIAM module 116 to efficiently organize and access identity data across the federated domains. For instance, the LDAP module can be used to validate a user's credentials when accessing resources in the enterprise platform credentials 140A or to retrieve role-specific metadata for a user operating in the servicing credentials 140B.

The entitlements module 154 can further serve a role in managing the specific access rights and permissions assigned to users. Entitlements can specify the actions users are authorized to perform and the resources they are allowed to access within each federated domain. For example, a user operating in the developer credentials 140C may have entitlements to test APIs in a sandbox environment, while a user in the third-party platform credentials 140D might have limited entitlements to view transaction data. The entitlements module 154 can interact with the unified policy framework of the CIAM module 116 to enforce consistent and secure access control across all domains.

Each of the domain-specific credentials depicted in FIG. 4 (e.g., enterprise platform credentials 140A, servicing credentials 140B, developer credentials 140C, and third-party platform credentials 140D) is organized into a plurality of components to ensure comprehensive management of identity and access. These components include an identity component 142A, a policy component 144A, a consent component 146A, an authorization component 148A, and an authentication component 150. Each component addresses a specific aspect of identity and access management, contributing to the overall functionality and adaptability of the CIAM module 116 across the federated domains.

For example, the identity component 142A can be configured to manage core user attributes and metadata associated with each user within a domain. This can include information such as user IDs, roles, and security clearances, necessary to define a user's identity within the specific domain. For example, in the developer credentials 140C, the identity component 142A may store attributes indicating a user's role as a developer with access to sandbox environments, while in the enterprise platform credentials 140A, the identity component 142A might identify the user as a financial officer with access to corporate treasury data. The identity component 142A can ensure that user-specific attributes are accurately represented and available for use in authentication, authorization, and other processes across the federated domains.

The policy component 144A can enforce access control rules and entitlement policies that define the scope of actions a user can perform within a domain. These policies can be configured based on organizational requirements and regulatory standards and can be dynamically applied to user interactions. For instance, in the servicing credentials 140B, the policy component 144B may enforce rules restricting access to account management tools to authorized service representatives. Similarly, in the third-party platform credentials 140D, the policy component 144D might limit data-sharing permissions for external partners. By centralizing and enforcing these policies, the policy component 144D can aid in ensuring consistent access control across all federated domains.

The consent component 146A can be configured to enable users to specify and manage their preferences regarding the sharing and use of their identity attributes within and across domains. For example, a user in the enterprise platform credentials 140A may grant consent for their location data to be shared for enhanced security purposes, while opting out of sharing the same information in the third-party platform credentials 140D. In embodiments, consent component 146A can track these preferences and ensures that user interactions align with the specified consent settings. The consent component 146A can play an important role in maintaining compliance with privacy regulations and respecting user-defined preferences within the federated ecosystem.

The authorization component 148A can govern the evaluation and granting of access requests based on a user's entitlements and contextual factors, such as device type or geographic location. For instance, a user accessing the servicing credentials 140B from a secure corporate network may be authorized to perform high-privilege actions, such as approving transactions, while the same user accessing from an untrusted device may be restricted to view-only permissions. Additionally, the authorization component 148A can dynamically assess and apply entitlements, ensuring that access is granted securely and in compliance with the organization's policies.

The authentication component 150 can validate user credentials and establish the authenticity of the user's identity within a federated domain. The authentication component 150 can support various authentication methods, including multi-factor authentication, to enhance security. For example, a user logging into the developer credentials 140C may be required to provide a password (something they know) and a one-time code generated by a security token (something they have). The authentication component 150 can integrate with the LDAP module 152 to retrieve user credentials and ensure that authentication processes are seamless and secure across all domains.

Figure 5:
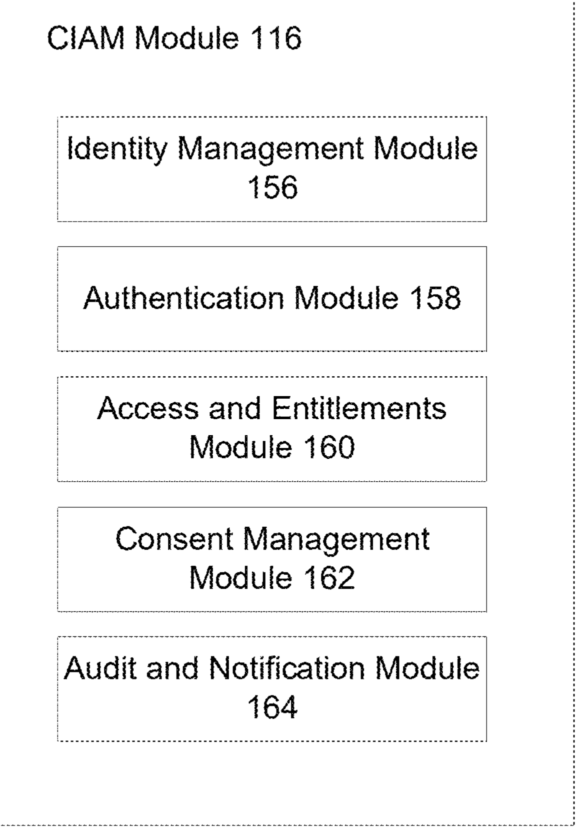
FIG. 5 illustrates an example logical components of a Customer Identity and Access Management module of FIG. 2.

FIG. 5 illustrates an embodiment of the CIAM module 116, depicting its architecture as comprising a plurality of modules that collectively enable secure and efficient identity and access management within a federated digital ecosystem. These modules can include an identity management module 156, an authentication module 158, an access and entitlements module 160, a consent management module 162, and an audit and notification module 164, each of which can perform a specific function that contributes to an ability to manage identity data, enforce access control, and ensure compliance across federated identity domains.

The identity management module 156 can store, organize, and synchronize user identity attributes across federated identity domains. These attributes can include user credentials, roles, and metadata necessary for defining a user's identity within the system. In some embodiments, the identity management module 156 can interact with other modules within the CIAM module 116 to ensure that identity data is consistently applied and accessible. For example, the identity management module 156 can provide identity attributes to the authentication module 158 for verifying user credentials and to the access and entitlements module 160 for evaluating permissions. By maintaining a centralized repository of identity data, the identity management module 156 can enable seamless integration and synchronization of user attributes across various channels, such as web, mobile, and embedded third-party systems.

The authentication module 158 can verify user identity and provide support for multi-factor authentication (MFA) and adaptive authentication mechanisms. The authentication module 158 can dynamically adjust authentication requirements based on contextual factors, such as the user's location, device type, or behavior, to enhance security while maintaining usability. For instance, in some embodiments, a user accessing the system from an unfamiliar device may be required to provide additional authentication factors, such as a one-time password or biometric verification. The authentication module 158 can leverage identity attributes stored in the identity management module 156 to validate credentials securely and reliably across the federated identity domains.

The access and entitlements module 160 can define and enforce user permissions based on role-based access control and attribute-based access control subsystems. The access and entitlements module 160 can evaluate user entitlements to determine what actions a user is authorized to perform or what resources they are allowed to access within a specific domain. For example, in some embodiments, the access and entitlements module 160 might grant a user in the enterprise platform credentials 140A the ability to approve transactions while limiting a user in the developer credentials 140C to testing APIs in a sandbox environment. By applying entitlements in accordance with organizational policies and contextual factors, the access and entitlements module 160 can ensure consistent and secure access control across the federated ecosystem.

The consent management module 162 can enable users to specify and update permissions for sharing their identity attributes within and across federated identity domains. The consent management module 162 can ensure that user preferences are respected and that data sharing aligns with regulatory compliance requirements. For example, in some embodiments, a user may grant consent to share their location data within the enterprise platform credentials 140A but restrict its use in the third-party platform credentials 140D. The consent management module 162 can track and enforce these preferences, ensuring that all user interactions adhere to the specified consent settings.

The audit and notification module 164 can provide mechanisms for monitoring, logging, and alerting. In some embodiments, the audit and notification module 164 can integrate with regulatory compliance systems to maintain audit logs of key activities, such as authentication attempts, access requests, and consent updates. These logs can enable transparency and traceability, ensuring compliance with applicable data privacy regulations. Additionally, the module can generate notifications to inform users of changes to their consent settings, entitlements, or authentication activity, providing real-time feedback and enhancing system security and user trust.

Collectively, these modules within the CIAM module 116 can enable comprehensive management of identity and access, facilitating secure, personalized, and compliant interactions across the federated digital ecosystem. By integrating these functionalities, the CIAM module 116 can provide a framework for supporting the diverse needs of users and organizations operating within this environment.

Figure 6:
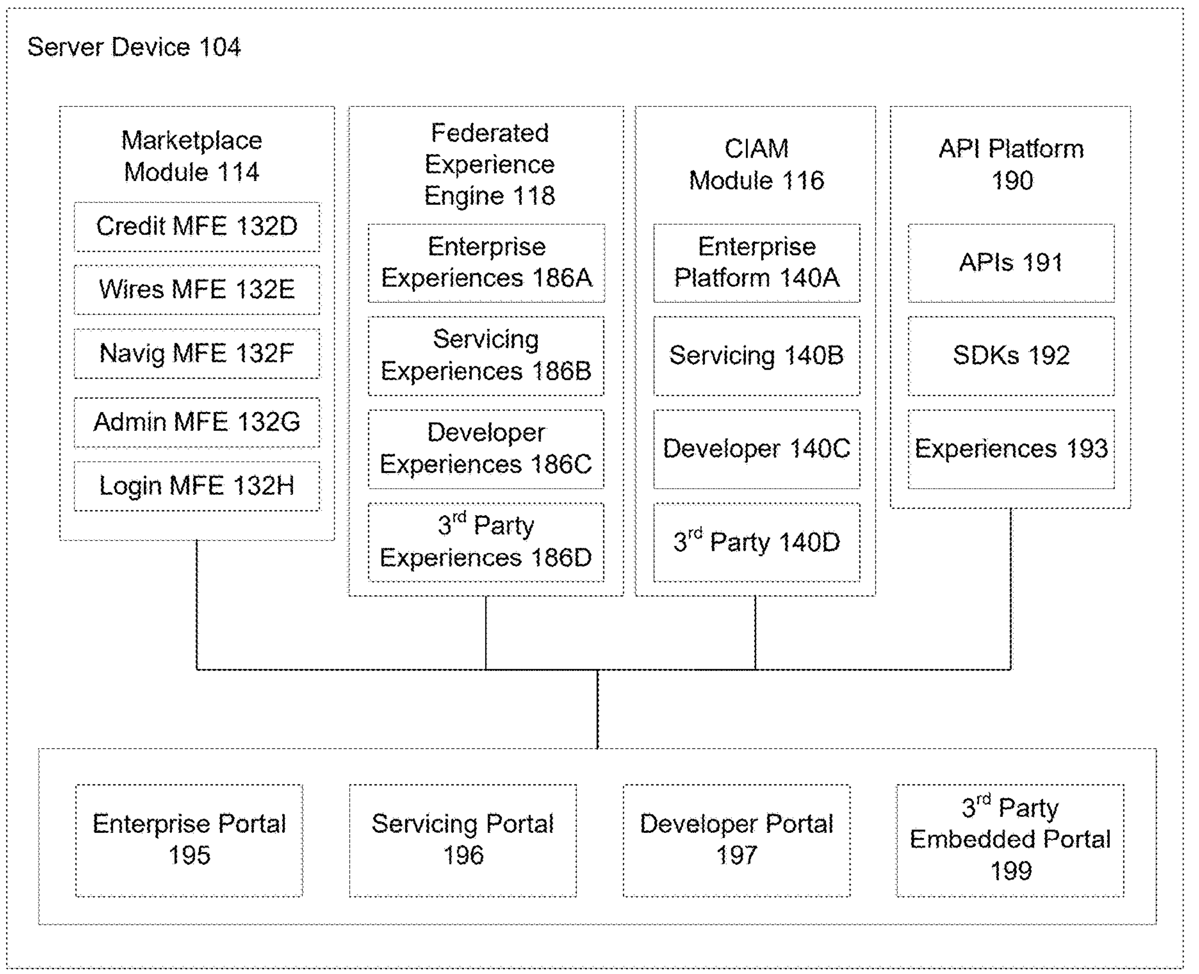
FIG. 6 illustrates an embodiment of the server device of FIG. 2 serving a plurality of portals.

FIG. 6 illustrates an embodiment of the server device 104, which integrates the marketplace module 114, the CIAM module 116, the federated experience engine 118, and an API platform 190 into a platform to serve a plurality of portals. Collectively, these modules are configured to provide secure and personalized user experiences across the plurality of portals, with each portal representing a federated domain. As used herein, the term federated refers to a distributed identity management framework in which user identity attributes, entitlements, and access controls are managed collaboratively across independent systems or organizations while maintaining consistent policies. A domain refers to a specific operational or organizational boundary within the federated framework, such as the enterprise platform domain, servicing domain, developer domain, or third-party platform domain, each with distinct user roles, functions, and access requirements.

Each portal—enterprise portal 195, servicing portal 196, developer portal 197, and third-party embedded portal 199—corresponds to a federated domain and serves as an access point tailored to the specific needs of its users. These portals provide distinct user interfaces and functionalities while leveraging the shared infrastructure of the server device 104. For example, the enterprise portal 195 may support financial professionals by providing dashboards for monitoring accounts and authorizing transactions. The servicing portal 196 may offer tools for customer service representatives to manage accounts and resolve customer queries. The developer portal 197 could cater to software developers by facilitating API testing and sandbox environments, while the third-party embedded portal 199 integrates select features and data into external partner platforms or customer-facing applications.

The marketplace module 114 serves as a repository for storing a plurality of reusable MFEs, which are modular user interface components designed to address specific functionalities within the system 100. These MFEs include, for example, a credit MFE 132D, a wires MFE 132E, a navigation MFE 132F, an administration MFE 132G, and a login MFE 132H. Each MFE represents an independent module or component that can be used alone or combined with other MFEs to create a customized user experience tailored to the specific needs of users within different portals.

For example, the credit MFE 132D can provide user interface functionality for managing credit-related tasks, such as applying for credit, viewing credit limits, or monitoring credit usage. The wires MFE 132E can facilitate wire transfer operations, enabling users to initiate, approve, and track wire transactions securely. The navigation MFE 132F can offer navigational elements, such as menus or search bars, to help users seamlessly explore the features and data available within a portal. The administration MFE 132G can provide administrative tools, such as managing user accounts, configuring system settings, or auditing activities. The login MFE 132H can handle user authentication processes, allowing users to securely access the system through single sign-on (SSO) or multi-factor authentication (MFA).

The CIAM module 116 is configured to manage the identity data, entitlements, and consent settings of users across federated domains, including enterprise platform credentials 140A, servicing credentials 140B, developer credentials 140C, and third-party credentials. Each of these credentials can represent the identity attributes, roles, and permissions associated with a specific operational or organizational domain. For instance, enterprise platform credentials 140A may include data for financial officers accessing corporate treasury tools, while servicing credentials 140B may pertain to customer service representatives managing account information. Developer credentials 140C could encompass roles and entitlements for software developers interacting with sandbox environments, and third-party platform credentials 140D may define the access and permissions granted to external partners or embedded systems. Additionally, the CIAM module 116 supports third-party consent mechanisms, allowing client credentials to be securely accessed and utilized by authorized external platforms. For instance, a third-party payment processor may access limited entitlements for initiating transactions based on user-granted consent. This integration ensures secure and compliant management of client credentials across diverse organizational contexts.

The federated experience engine 118 includes an enterprise experiences module 186A, a servicing experiences module 186B, a developer experiences module 186C, and a third-party experiences module 186D. These modules are configured to create tailored user experiences for specific portals—enterprise portal 195, servicing portal 196, developer portal 197, and third-party embedded portal 199—based on the identity data managed by the CIAM module 116. The federated experience engine 118 can dynamically assemble MFEs retrieved from the marketplace module 114 by applying contextual rules and user preferences, ensuring that each portal delivers an interface uniquely suited to its users' roles, entitlements, and consent settings.

In some embodiments, the enterprise experiences module 186A focuses on crafting user interfaces for enterprise users, such as financial officers or corporate administrators, integrating tools for account management, transaction approvals, and analytics dashboards. The servicing experiences module 186B can generate workflows and interfaces for customer service representatives, providing features such as account lookup, issue resolution, and secure communication tools. The developer experiences module 186C can support software developers by offering access to testing environments, API documentation, and development tools. The third-party experiences module 186D can customize embedded user interfaces for external partners, such as business collaborators or integrated systems, ensuring secure and limited access to necessary data and functions.

The API platform 190 complements the federated experience engine 118 by enabling interactions between the server device 104 and external systems. For example, in some embodiments, the API platform 190 includes APIs 191, which expose specific system functionalities; SDKs 192, which provide development tools for building custom applications; and experiences 193, which represent preconfigured modules or templates that external systems can leverage. For example, APIs 191 might allow the developer portal 197 to access endpoints for retrieving test data, while SDKs 192 can enable third-party developers to create customized integrations. Experiences 193 can provide prebuilt workflows or data visualizations, streamlining the development process for partners using the third-party embedded portal 199.

The federated experience engine 118 communicates with the CIAM module 116 to retrieve user identity attributes, entitlements, and consent settings, ensuring that the generated user interfaces adhere to organizational policies and user preferences. Simultaneously, the federated experience engine 118 interacts with the marketplace module 114 to select and integrate MFEs that align with the specific requirements of each portal. The API platform 190 facilitates the delivery of these experiences by enabling secure data exchange and providing external systems with controlled access to system resources, ensuring that the user interfaces and functionalities remain consistent and compliant across the federated ecosystem.

Figure 7:
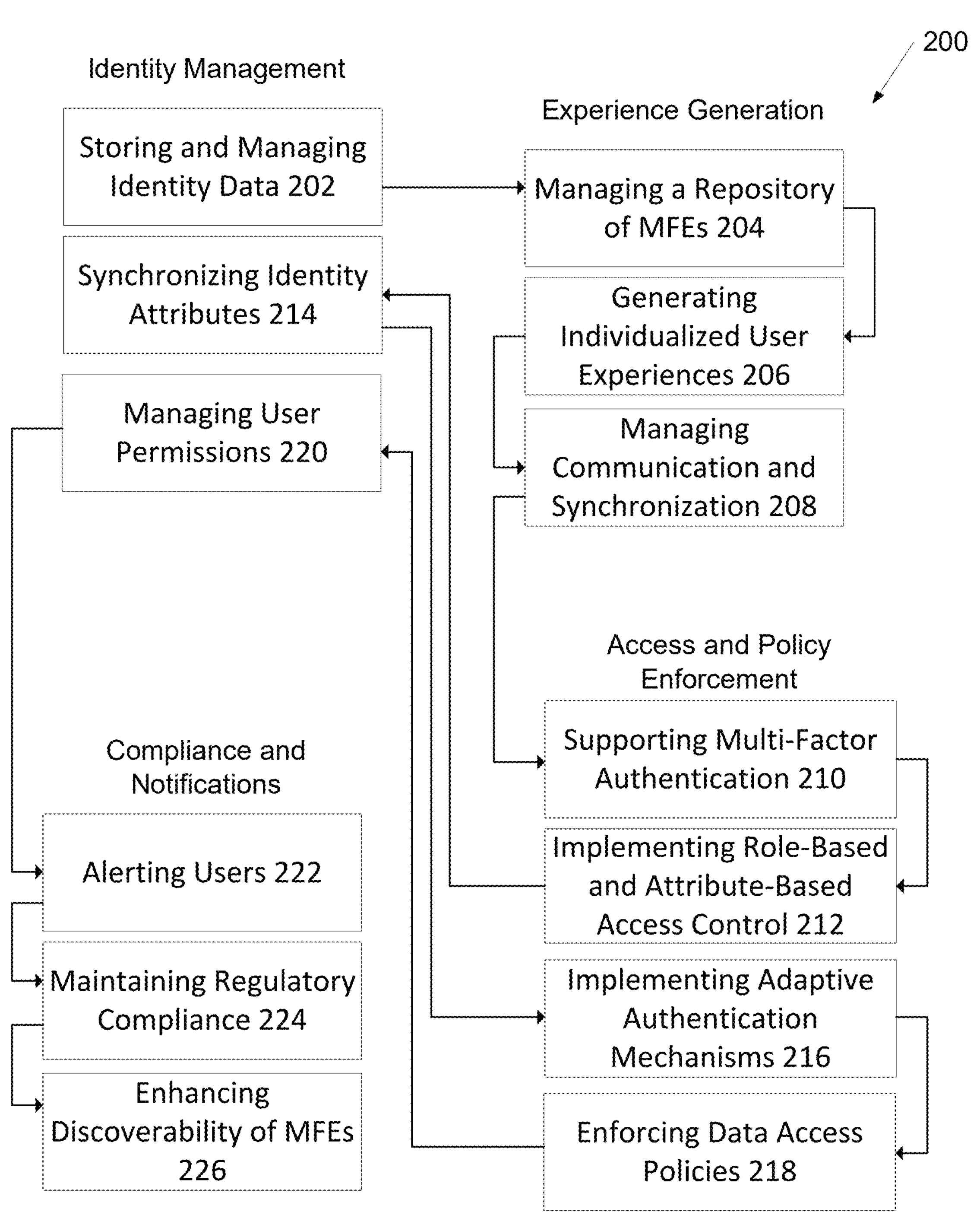
FIG. 7 illustrates a method for managing identity and access in a federated digital ecosystem of FIG. 1.

FIG. 7 illustrates a method 200 for managing identity and access in a federated digital ecosystem. The method 200 includes steps that collectively address identity management, experience generation, access policy and enforcement, and compliance and notification, which provide an operational framework for enabling secure, adaptive, and personalized interactions across multiple federated domains. The method 200 allows for flexibility, with steps performed in any order to maintain functionality, and certain steps may be omitted when not required for a particular deployment scenario.

The method 200 begins with steps related to identity management. At step 202, the method 200 involves storing and managing identity data associated with a plurality of users. Each user is associated with one or more federated identity domains, which represent distinct organizational boundaries for managing identity and access. Step 202 ensures secure storage of user credentials, roles, entitlements, and consent settings, forming the foundation for subsequent processes. At step 214, identity attributes are synchronized across federated domains, ensuring consistency and seamless operation even as updates are made to user attributes, entitlements, or consent settings. Additionally, at step 220, the method enables users to specify and update permissions for sharing specific identity attributes across domains, giving users control over their data and ensuring compliance with privacy preferences and organizational policies.

Steps related to generating user experiences focus on leveraging identity data and modular interface components to deliver personalized interactions. At step 204, the method manages a repository of MFEs stored in a marketplace. These MFEs are modular user interface components conformant with a predefined platform framework and can be retrieved and reused across different portals and applications. At step 206, individualized user experiences are dynamically generated by assembling MFEs retrieved from the marketplace. Contextual rules and user preferences guide this process, ensuring tailored interfaces across channels such as web, mobile, and embedded third-party systems. At step 208, the method manages communication and synchronization between system components, ensuring that updates to identity data, including user attributes, entitlements, and consent settings, are consistently propagated. This synchronization allows the dynamic assembly of MFEs to reflect the most current identity data, maintaining consistency and relevance across all user interactions. Together, these steps ensure that user experiences are not only personalized but also seamlessly aligned with real-time updates to the system's identity management framework.

To enforce access policies and maintain security, the method includes steps designed to manage authentication and access control dynamically. At step 210, multi-factor authentication is supported to verify user identity through at least two factors, such as passwords, tokens, or biometrics. At step 212, role-based access control and attribute-based access control are implemented to ensure users access only the resources for which they are authorized. Role-based access control associates predefined roles with specific permissions, while attribute-based access control evaluates user-specific attributes such as location or device type to dynamically determine access permissions. At step 216, adaptive authentication mechanisms are implemented to adjust authentication requirements based on contextual factors like user behavior or the sensitivity of the accessed resource, enhancing security without compromising the user experience. At step 218, data access policies are enforced to verify that identity data, entitlements, and channel-specific preferences conform to organizational rules and access policies.

The method also addresses compliance and notification, ensuring transparency and regulatory adherence. At step 222, users are alerted to changes in consent settings, entitlements, or authentication activity through a notification engine, promoting awareness and trust. At step 224, the method integrates with regulatory compliance systems and maintains an audit log of authentication attempts, access requests, and consent updates. This ensures adherence to data privacy regulations applicable to federated identity domains and provides an audit trail for accountability. At step 226, the discoverability of MFEs is enhanced through metadata tagging within the marketplace, enabling efficient search and reuse of these components for seamless experience customization.

Together, these steps form a framework for managing identity and access in a federated digital ecosystem. By addressing identity data storage, personalized experience generation, access policy enforcement, and regulatory compliance, the method ensures secure, adaptive, and user-centric interactions tailored to the roles, preferences, and entitlements of users across diverse organizational domains.

Figure 8:
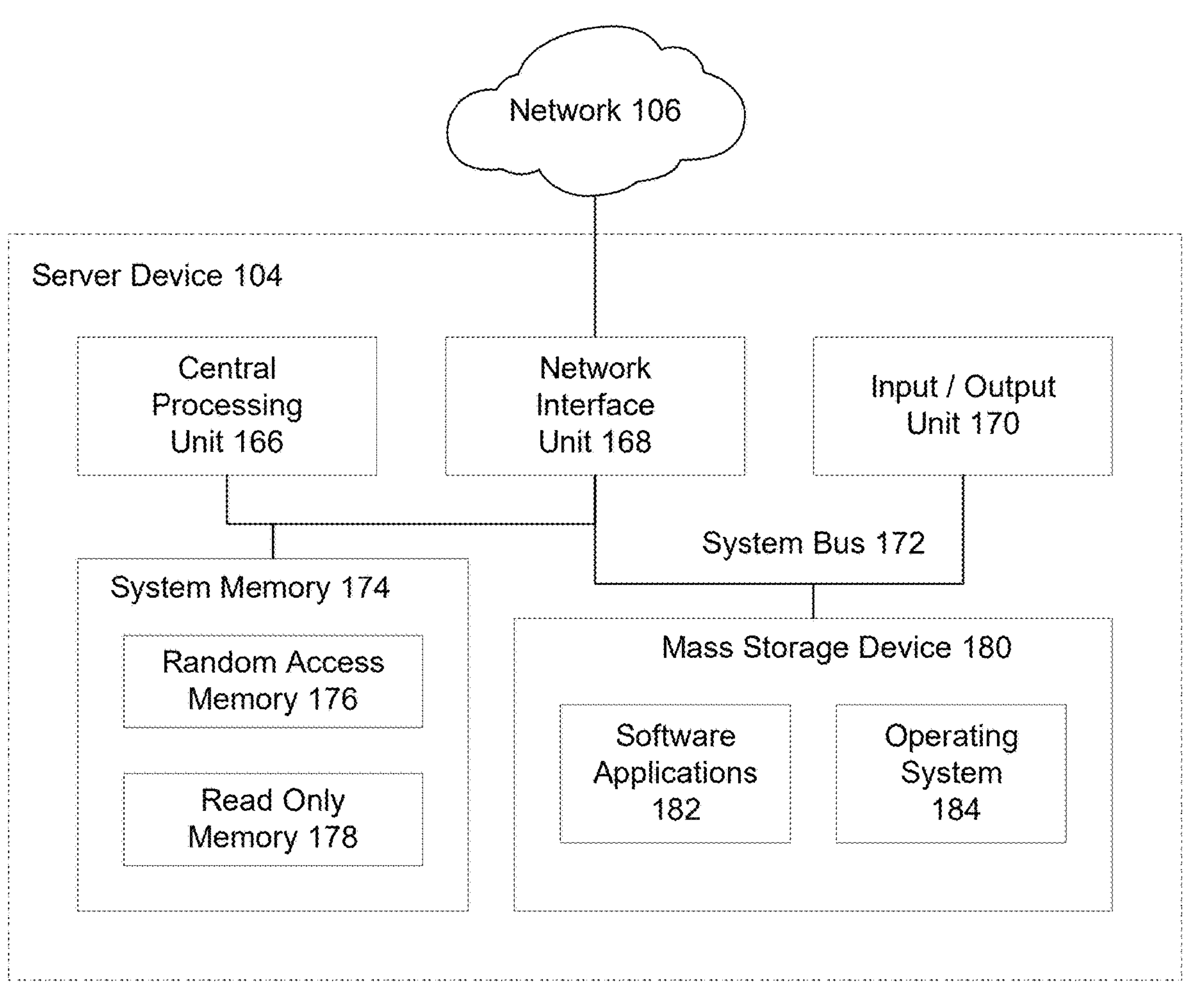
FIG. 8 shows example components of the server device of FIG. 1.

As illustrated in the embodiment of FIG. 8, the example server device 104, which provides the functionality described herein, can include at least one central processing unit (CPU) 166, a system memory 174, and a system bus 172 that couples the system memory 174 to the CPU 166. The system memory 174 includes a random access memory (RAM) 176 and a read-only memory (ROM) 178. A basic input/output system containing the basic routines that help transfer information between elements within the server device 104, such as during startup, is stored in the ROM 178. The server device 104 further includes a mass storage device 180. The mass storage device 180 can store software instructions and data. A central processing unit, system memory, and mass storage device similar to that shown can also be included in the other computing devices disclosed herein.

The mass storage device 180 is connected to the CPU 166 through a mass storage controller (not shown) connected to the system bus 172. The mass storage device 180 and its associated computer-readable data storage media provide non-volatile, non-transitory storage for the server device 104. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs (DVDs), other optical storage media, magnetic cassettes, magnetic tape, magnetic disk storage or other magnetic storage devices, or any other medium which can be used to store the desired information and which can be accessed by the server device 104.

According to various embodiments of the invention, the server device 104 may operate in a networked environment using logical connections to remote network devices through network 106, such as a wireless network, the Internet, or another type of network. The network 106 provides a wired and/or wireless connection. In some examples, the network 106 can be a local area network, a wide area network, the Internet, or a mixture thereof. Many different communication protocols can be used.

The server device 104 may connect to network 106 through a network interface unit 168 connected to the system bus 172. It should be appreciated that the network interface unit 168 may also be utilized to connect to other types of networks and remote computing systems. The server device 104 also includes an input/output controller 170 for receiving and processing input from a number of other devices, including a touch user interface display screen or another type of input device. Similarly, the input/output controller 170 may provide output to a touch user interface display screen or other output devices.

As mentioned briefly above, the mass storage device 180 and the RAM 176 of the server device 104 can store software instructions and data. The software instructions include an operating system 184 suitable for controlling the operation of the server device 104. The mass storage device 180 and/or the RAM 176 also store software instructions and applications 182, that when executed by the CPU 166, cause the server device 104 to provide the functionality of the server device 104 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system, comprising:

at least one processor; and non-transitory computer-readable storage storing instructions that, when executed by the at least one processor, cause the system to:

store and manage identity data associated with a plurality of users associated with one or more federated identity domains representing a distinct organizational boundary for managing identity and access;

provide authentication and access control services based on one or more publicly available protocols;

implement a unified policy framework for enforcing access control, user entitlements, and consent management across the one or more federated identity domains;

store and manage a repository of micro frontend experiences in a marketplace, wherein each of the micro frontend experiences is a reusable, modular user interface component conformant with a predefined platform framework, and wherein the marketplace is configured to enable retrieval and reuse of the micro frontend experiences across a plurality of application experiences associated with the one or more federated identity domains;

dynamically generate user experiences by assembling the micro frontend experiences retrieved from the marketplace based on contextual rules and user preferences;

integrate identity and access management data associated with at least one federated identity domain of the one or more federated identity domains to personalize the user experiences across one or more channels, the one or more channels including web, mobile, and embedded third-party systems; and manage communication and synchronization to ensure that updates to the identity data, including user attributes, the user entitlements, and consent settings, are consistently propagated across the one or more federated identity domains, and that such updates are reflected in the retrieval, assembly, and presentation of the user experiences.

2. The system of claim 1, wherein the system is further configured to support multi-factor authentication for verifying user identity across the one or more federated identity domains.

3. The system of claim 1, wherein the unified policy framework includes at least one of: (a) role-based access control, which associates predefined roles with specific sets of permissions to grant or restrict access to resources within the one or more federated identity domains; or (b) attribute-based access control, which evaluates user-specific attributes, including user location, device type, or security clearance, to dynamically determine access permissions within the one or more federated identity domains.

4. The system of claim 1, wherein the system is configured to manage the identity data by synchronizing user credentials, roles, and entitlements across the one or more federated identity domains, ensuring consistent identity attributes across the one or more channels.

5. The system of claim 1, wherein the system is configured to implement an adaptive authentication mechanism, wherein one or more authentication requirements dynamically adjust based on contextual factors, including user behavior, geographic location, or a sensitivity of an accessed resource.

6. The system of claim 1, wherein the identity data includes a user role, entitlement, and channel-specific preferences, and wherein the system ensures that the identity data conforms to access policies defined within the unified policy framework.

7. The system of claim 1, wherein the system is configured to enable users to specify and update permissions for sharing specific identity attributes across the one or more federated identity domains.

8. The system of claim 1, further comprising a notification engine configured to alert users of changes to the consent settings, the user entitlements, or authentication activity within the one or more federated identity domains.

9. The system of claim 1, wherein the system is further configured to integrate with regulatory compliance systems and is configured to maintain an audit log of authentication attempts, access requests, and consent updates to ensure compliance with data privacy regulations applicable to the one or more federated identity domains.

10. The system of claim 1, wherein the marketplace is further configured to provide metadata tagging for the micro frontend experiences, enabling enhanced discoverability and reuse of the micro frontend experiences across the one or more federated identity domains.

11. A method for managing identity and access in a federated digital ecosystem, comprising:

storing and managing identity data associated with a plurality of users, wherein each of the plurality of users is associated with one or more federated identity domains, each of the one or more federated identity domains representing a distinct organizational boundary for managing identity and access;

providing authentication and access control services based on one or more publicly available protocols;

implementing a unified policy framework for enforcing access control, user entitlements, and consent management across the one or more federated identity domains;

storing and managing a repository of micro frontend experiences in a marketplace, wherein each of the micro frontend experiences is a reusable, modular user interface component conformant with a predefined platform framework, and enabling retrieval and reuse of the micro frontend experiences across a plurality of application experiences associated with the one or more federated identity domains;

dynamically generating user experiences by assembling the micro frontend experiences retrieved from the marketplace based on contextual rules and user preferences;

integrating identity and access management data associated with at least one federated identity domain to personalize the user experiences across one or more channels, the one or more channels including web, mobile, and embedded third-party systems; and managing communication and synchronization to ensure that updates to the identity data, including user attributes, the user entitlements, and consent settings, are consistently propagated across the one or more federated identity domains, and that such updates are reflected in retrieval, assembly, and presentation of the user experiences.

12. The method of claim 11, further comprising supporting multi-factor authentication for verifying user identity across the one or more federated identity domains.

13. The method of claim 11, wherein the unified policy framework includes at least one of: (a) role-based access control, which associates predefined roles with specific sets of permissions to grant or restrict access to resources within the one or more federated identity domains; or (b) attribute-based access control, which evaluates user-specific attributes, including user location, device type, or security clearance, to dynamically determine access permissions within the one or more federated identity domains.

14. The method of claim 11, further comprising synchronizing user credentials, roles, and entitlements across the one or more federated identity domains to ensure consistent identity attributes across the one or more channels.

15. The method of claim 11, further comprising implementing an adaptive authentication mechanism, wherein one or more authentication requirements dynamically adjust based on contextual factors, including user behavior, geographic location, or a sensitivity of an accessed resource.

16. The method of claim 11, wherein the identity data includes a user role, entitlement, and channel-specific preferences, and further comprising ensuring that the identity data conforms to access policies defined within the unified policy framework.

17. The method of claim 11, further comprising enabling users to specify and update permissions for sharing specific identity attributes across the one or more federated identity domains.

18. The method of claim 11, further comprising alerting users of changes to the consent settings, the user entitlements, or authentication activity within the one or more federated identity domains via a notification engine.

19. The method of claim 11, further comprising integrating with regulatory compliance systems and maintaining an audit log of authentication attempts, access requests, and consent updates to ensure compliance with data privacy regulations applicable to the one or more federated identity domains.

20. The method of claim 11, further comprising providing metadata tagging for the micro frontend experiences within the marketplace, enabling enhanced discoverability and reuse of the micro frontend experiences across the one or more federated identity domains.

* * * * *